United States Patent
Coetsier et al.

[11] Patent Number: 5,777,224
[45] Date of Patent: Jul. 7, 1998

[54] ROTATABLE DRIVE SPINDLE FOR QUICK MOUNTING, AND MACHINE COMPRISING SUCH A SPINDLE

[75] Inventors: Paul Coetsier, Pomponne; Olivier Sauzay, Coudray, both of France

[73] Assignee: Muller BEM, Chartres Cedex, France

[21] Appl. No.: 724,918

[22] Filed: Oct. 2, 1996

[30] Foreign Application Priority Data

Oct. 4, 1995 [FR] France ................. 95.11653

[51] Int. Cl.⁶ .................................. G01M 1/06
[52] U.S. Cl. ................................................ 73/487
[58] Field of Search ................ 73/487, 462; 157/14, 157/20, 21; 301/5.21, 5.22; 269/48.1

[56] References Cited

U.S. PATENT DOCUMENTS 4,202,213  5/1980  Toriselli ....................... 73/487
5,615,574  4/1997  Drechsler ..................... 73/487

FOREIGN PATENT DOCUMENTS 0 550 816   7/1993   European Pat. Off. .
28 13 387   10/1978  Germany .
40 00 424   7/1991   Germany .

Primary Examiner—Christine K. Oda
Attorney, Agent, or Firm—Young & Thompson

[57] ABSTRACT

A rotatable drive spindle for quick mounting comprises a hollow shaft (10) mounted rotatably in two bearings (3a, 3b) and a control rod (9) passing through the hollow shaft (10) and displaceable between a locking position and an unlocking position. A prestressed resilient spring is provided continuously to urge the control rod (9) toward the first locking position and a pneumatic jack (6) is provided to act against the spring (19) and press the control rod (9) toward the unlocking position. This jack (6) is mounted relative to the hollow drive shaft (10) and to the control rod (9) with an arrangement analogous to that of a hub puller, which is to say in a manner such that pulling on a configuration (11) secured to the hollow drive shaft (10) presses on the control rod (9) but does not exert any force on the bearings (3a, 3b).

20 Claims, 3 Drawing Sheets

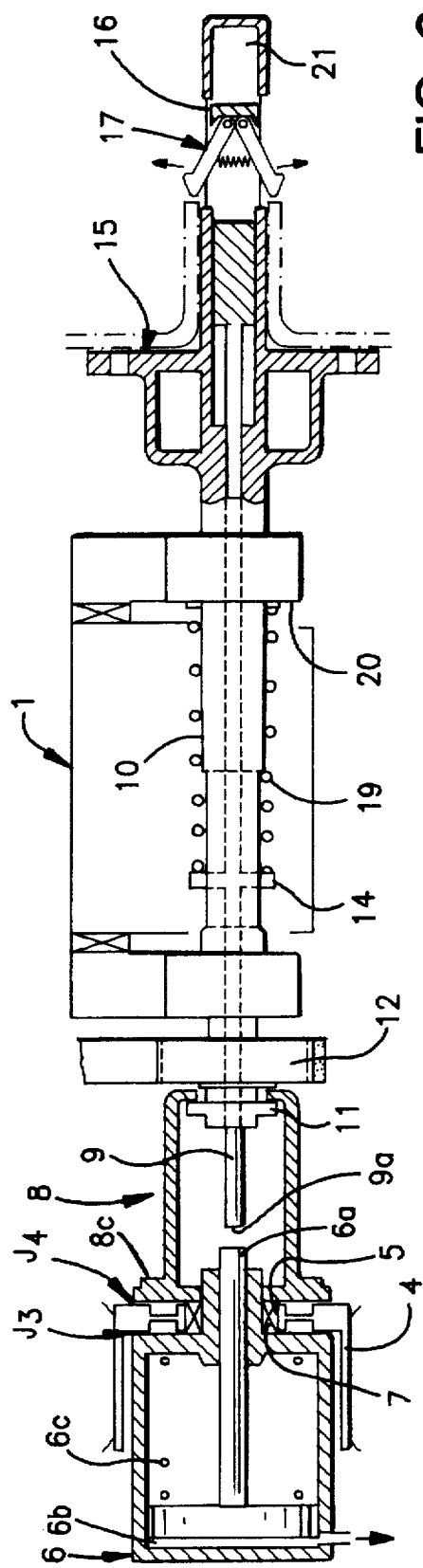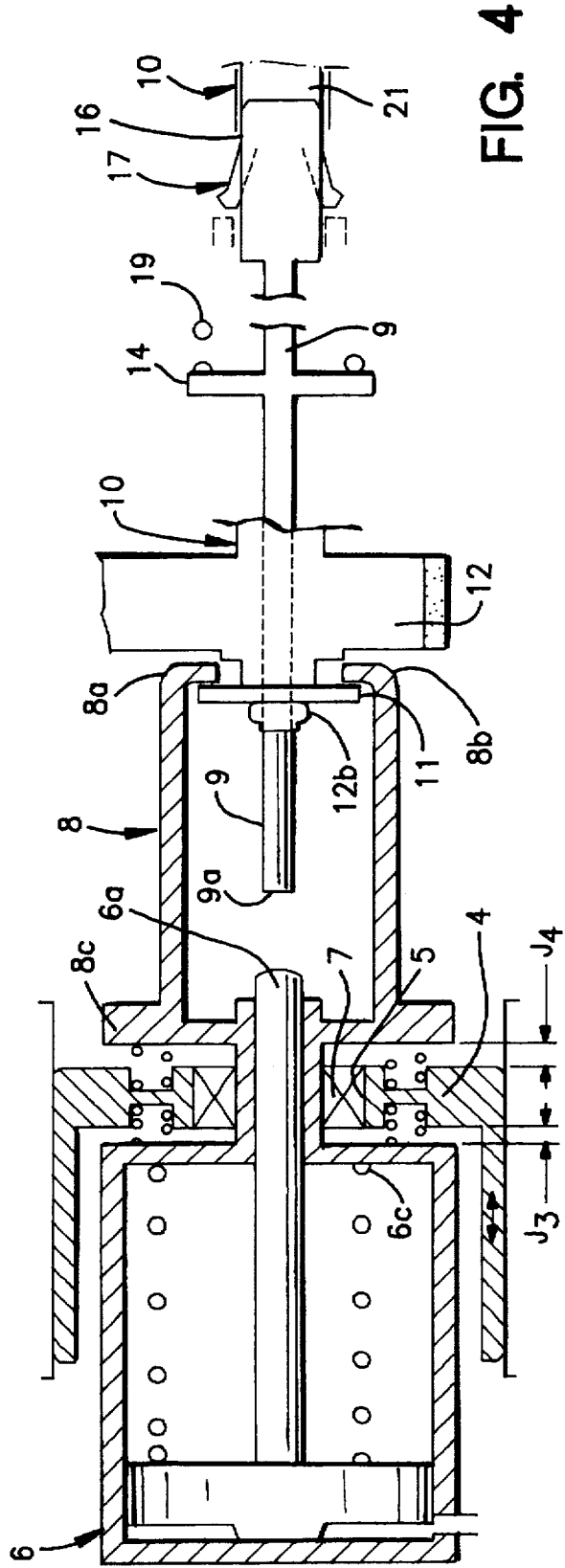

ROTATABLE DRIVE SPINDLE FOR QUICK MOUNTING, AND MACHINE COMPRISING SUCH A SPINDLE

BACKGROUND OF THE INVENTION

1. Field of the Invention

The present invention relates to a rotatable drive spindle for quick mounting, of the type comprising a hollow shaft mounted rotatably on two spaced bearings and carrying at a first end means to start it and drive it in rotation and at the second end a mounting flange fixing a reference and holding plane of a body driven in rotation; a control rod traverses said hollow shaft and is displaceable between two positions of which the first corresponds to the securement of the body with the rotatable drive shaft and the second corresponds to releasing said body.

The invention is particularly useful for balancing wheel vehicles and the measurement of physical parameters necessary for this purpose.

The invention also relates to a machine such as a balancer provided with a rotatable drive spindle according to the invention.

2. Description of the Related Art

U.S. Pat. No. 4,202,213 relates to apparatus for automatically locking the wheels of automotive vehicles on balancing machines.

This apparatus is generally satisfactory but has the drawback that the rotatable drive apparatus is relatively large and comprises particularly all or a portion of a pneumatic control jack for locking, actuating a control rod.

Upon cutting off the supply of compressed air, this apparatus offers no security and automatically unlocks the wheel rim, which can lead to accidents for personnel and damage to the material.

Moreover, the presence of undesirable rotating members at the end of the rotatable drive shaft introduces supplemental unbalance and systematic errors in measurements, which leads to poor quality of balancing.

SUMMARY OF THE INVENTION

The invention has for its object to overcome the drawbacks of the prior art, by providing a new spindle for rapid mounting, useful in any type of machine and particularly useful as a component of a balancer, ensuring the safety of personnel and providing good quality of measurement.

The invention has for its object a rotatable drive spindle for quick mounting, particularly for mounting and holding a wheel to be balanced on a balancer, of the type comprising a hollow shaft mounted rotatably in two spaced bearings and carrying at one end a starting and drive means in rotation and at the second end a mounting flange determining a reference and holding plane for the rim of the wheel to be balanced or of the body driven in rotation; a control rod passing through said hollow shaft and displaceable between two positions of which the first corresponds to displacement of locking means for the rim or body on said mounting flange and the second corresponds to the release of said locking means and to the freeing of the rim or of the body; first prestressed elastic means provided to urge continuously the control rod toward the first locking position and second means provided to act against said first means and to press the control rod toward the second unlocking position, characterized in that the second means is mounted relative to the hollow drive shaft and to the control rod in an arrangement analogous to that of a hub puller, which is to say pulling on a configuration integral with the hollow drive shaft to press against the control rod without exerting any force on the bearings.

According to other characteristics of the invention:

the first resilient prestressed means is a spring, the second means is a pneumatic, electric or hydraulic means;

the second means is mounted substantially coaxially with the control rod according to a floating mounting, so as not to be in contact with the control rod during rotation of the spindle in the first locked position;

the second means is so shaped as not to exert any force on the rollers of the bearings;

the control rod carries at one end said locking means and has at the other end a bearing surface spaced from said second means in the first locking position, such as to prevent any influence or interaction of the second means on the rotation of the spindle or the measures takes during rotation of the spindle;

the second means is prestressed in a spaced position with a predetermined play relative to the hollow shaft in the course of the rotation of the latter;

the control rod carries an abutment, adapted to slide in a longitudinal opening of the hollow shaft between said first position and said second position, the first resilient means is prestressed between this abutment and a structure secured to the hollow shaft.

The invention also has for its object a machine or balancer comprising a spindle according to the preceding, characterized in that the balancer comprises, on the one hand, a fixed plate carrying the two spaced bearings on which is mounted for rotation an assembly comprising a hollow shaft, the control rod, the first prestressed elastic means and the extensible locking means and, on the other hand, a support on which is mounted said second means.

According to other characteristics of the invention:

said second means is mounted trapped on its support with predetermined sliding play in the direction of movement of the control rod;

the first prestressed resilient means is secured in rotation with the rotatable drive shaft and between the two spaced bearings secured to the plate.

BRIEF DESCRIPTION OF THE DRAWINGS

The invention will be better understood from the description which follows, given by way of non-limiting example, with reference to the accompanying drawings, in which:

FIG. 2 shows schematically a plan view of a spindle according to the invention with radial sectioning, in the locked position.

FIG. 4 shows schematically a fragmentary enlarged view similar to FIG. 2, showing the operation of a spindle according to the invention.

DESCRIPTION OF THE PREFERRED EMBODIMENT

Figure 1:
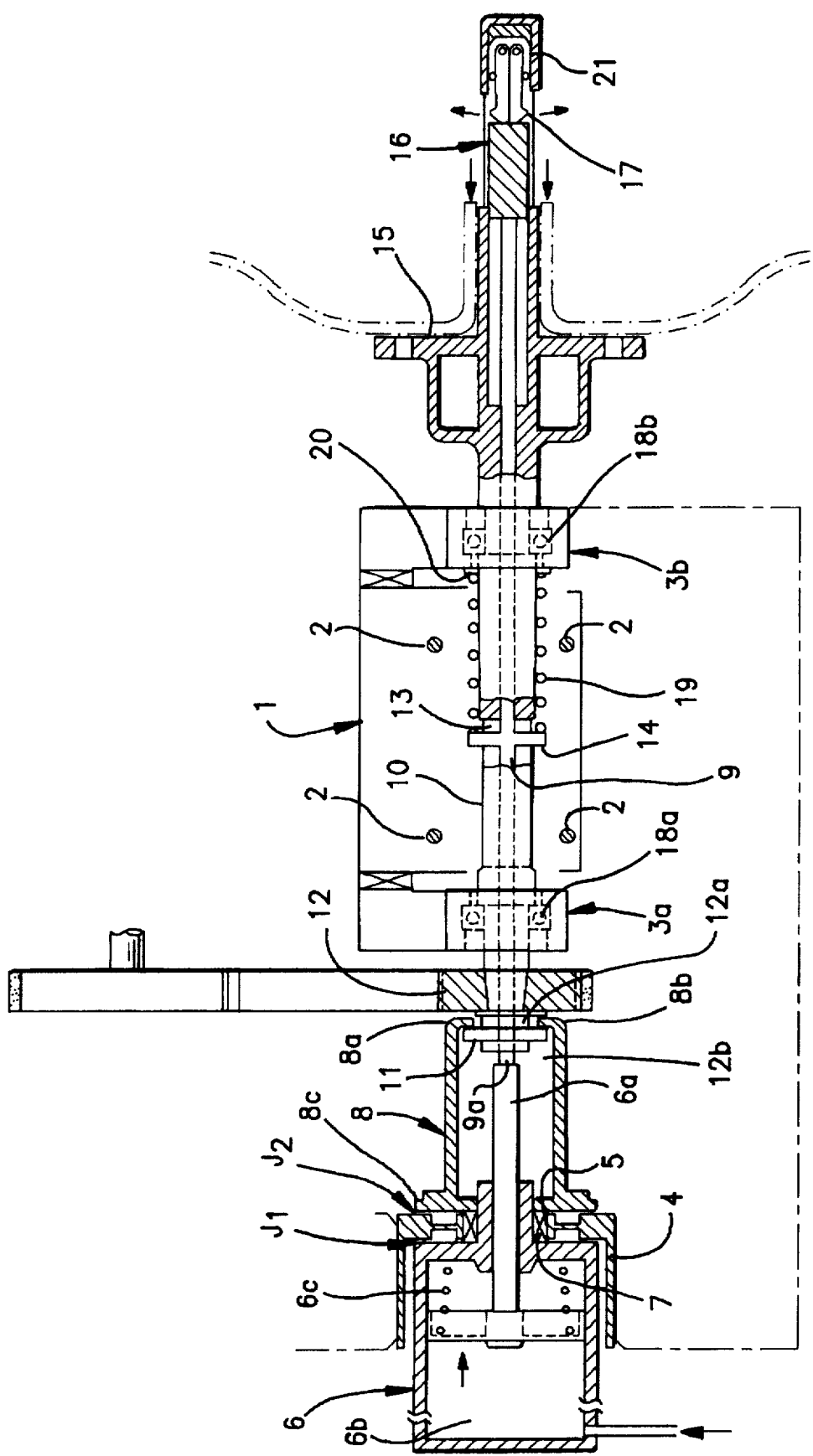
FIG. 1 shows schematically a plan view partially in radial cross section of a spindle according to the invention in the unlocked position.
Figure 3:
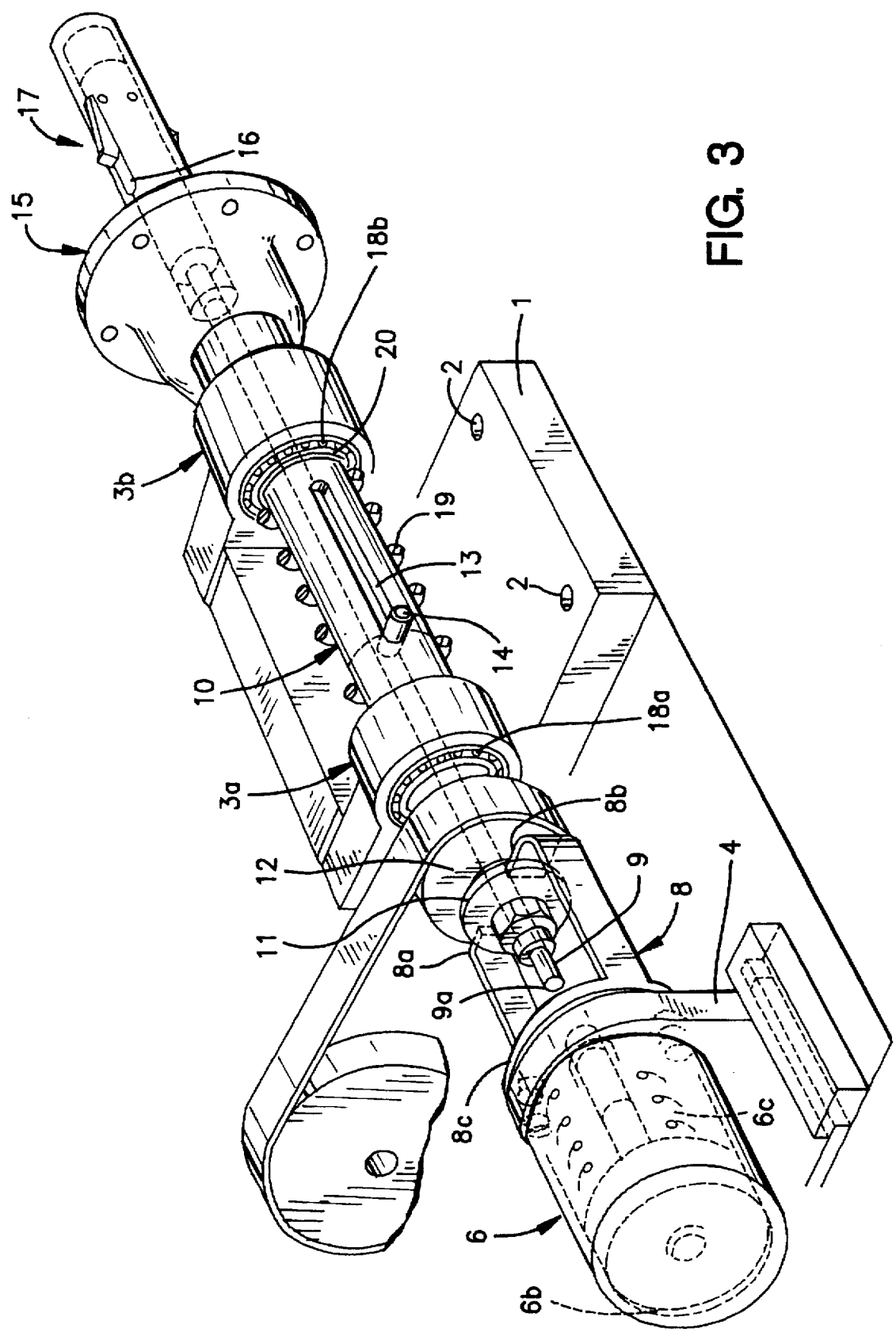
FIG. 3 shows schematically a perspective view with parts broken away of a spindle according to the invention.

With reference to FIGS. 1 to 4, the identical reference numerals designate identical elements or functional equivalents.

A balancer comprises a frame permitting permanently securing a plate 1 by means of bolts 2, so as to support bearings 3a, 3b spaced from each other on which is mounted rotatably a rotating assembly described hereinafter. The balancing frame also carries a support 4 constituted by a thick plate with a central bore 5.

A pneumatic jack 6 is mounted trapped in this bore 5 by means of a socket 7 in a mounting providing a predetermined longitudinal sliding play, corresponding to the sum of the distances $j_1$ and $j_2$ (FIG. 1) or $j_3$ and $j_4$ (FIG. 2).

The jack 6 is preferably a pneumatic jack, but could also be constituted by a hydraulic jack, an electric traction means or other equivalent mechanical means.

The body of the jack 6 is secured to the socket 7 and carries a ferrule 8 having two end grippers 8a, 8b.

The jack 6 is thus mounted trapped relative to the support 4 secured to the frame of the balancer by a coaxial floating mounting with movable means adapted to be driven in rotation, so as not to be in contact with this movable means driven in rotation in the locked position corresponding to FIG. 2, and so as to act on this movable means in the manner of a hub puller in the unlocked position corresponding to FIG. 1.

In FIG. 1, the rod 6a of the jack bears on a control rod 9 passing through the hollow shaft 10 for driving in rotation, whilst the ferrule 8 pulls on the disk 11 secured to the rotatable drive shaft being gripped for example between two nuts 12a and 12b.

In the operation shown in FIG. 1, the tractive force of the ferrule 8 on the disk 11 is transmitted by the jack 6 by means of the rod 6a of the jack bearing on the control rod 9. From a mechanical point of view, no force from the frame of the balancer is thus exerted on the rotatable drive shaft 10 or on the control rod 9, given that the jack 6 is mounted with predetermined sliding play $j_1+j_2$ in the support 4 secured to the frame.

Moreover, no force is transmitted to the rollers 18a and 18b because the traction on the shaft 10 balances the pressure on the control rod 9: thus, even after the repetition of numerous cycles, the rollers 18a and 18b and the bearings 6a and 6b will not be subjected to any constraint that could disturb the good operation of the machine.

The movable means comprises a hollow shaft 10 carrying the disk 11 secured by means of nuts 12a and 12b, means 12 for starting and driving in rotation of the pulley type or the like, an opening 13 closed at its two ends serving for guiding an abutment 14 secured to the control rod 9, a mounting flange 15 fixing a reference and holding plane for the rim of a wheel to be balanced or of a body driven in rotation, and another passage opening 16 for the deployment of locking means 17 constituted by two grippers prestressed in open position by a spring.

The assembly of this movable equipment is mounted in rotatable bearings 3a and 3b by means for example of ball bearings 18a and 18b.

A spring 19 is disposed between a configuration 20 or a shoulder solid with the hollow shaft 10 and the abutment 14 solid with the control rod 9. The spring 19 is preferably a helicoidal compression spring prestressed so as to push back the abutment 14 in the position of FIG. 2 corresponding to locking.

To pass from the position of FIG. 2 corresponding to locking to the position of FIG. 1 corresponding to unlocking and the freeing of the rim or body bearing on the flange 15, it suffices to supply the chamber 6b of the pneumatic jack with compressed air, so as to transmit the traction exerted by the ferrule 8 on the disk 11 into pressure exerted by the rod 6a of the jack 6 on the control rod 9 of the movable equipment.

In this position, the spring 19 is compressed by the displacement of the abutment 14 and the pinchers of the locking means 17 are pressed into the end recess 21 and fold toward each other and retract within the interior of the geometric cylinder enclosing the rotatable drive shaft 10.

Thanks to the invention, there is thus obtained absolute safety for the personnel because the rim or rotatable body is constantly maintained in bearing relationship by the deployed locking means 17 controlled by the rod 9 subjected to the action of the compression spring 19 which maintains the latter in the position of FIG. 2.

Preferably, the jack 6 is a jack with a return spring 6c supplied with compressed air by an electric control distributor. The electric signal of this control is used by a safety program or equivalent electromechanical mounting preventing the rotation of the drive shaft 10 when the jack 6 is supplied with compressed air to effect unlocking. An electrical override signal is provided to prevent the unlocking in the course of rotation of the drive shaft 10.

Preferably, the second means which constitutes the jack 6 is mounted substantially coaxially with the control rod 9 in a floating mounting, so as not to be in contact with the control rod 9 during the rotation of the movable equipment in locked position (FIG. 2). Because of this floating mounting, the assembly comprising the jack 6 and the stirrup 8 moves during starting in rotation of the movable equipment so as not to be in contact with the control rod 9 or the disk 11 of the rotatable drive shaft 10.

The assembly of the device operates in a manner analogous to that of a hub puller, by transmitting the tractor force of the grippers 8a, 8b of the ferrule 8 on the disk 11 to the control rod 9 by means of the jack 6 when the latter is supplied with compressed air at a pressure sufficient to act against the prestressed spring 19 and to press the control rod 9 toward the unlocking position (FIG. 1).

The mounting of the control rod 9 is facilitated because opposite the end bearing the extensible locking means 17 is located simply a flat bearing surface 9a adapted to coact with the end of the rod 6a of the jack 6. The bearing surface 9a is spaced from the rod 6a of the jack 6 in the locked position of FIG. 2, which has the advantage of not transmitting any influence or interaction from the frame or the jack 6 adapted to interfere with the rotative movement of the spindle or to throw off the measurements effected during rotation of the spindle.

Preferably, the body of jack 6 can be maintained in a position spaced from the movable equipment by suitable resilient means such as springs disposed on opposite sides of the support 4, between the cylinder of jack 6 and the base 8c of the stirrup 8. The fact of prestressing in position the second means comprising the jack 6 with its rod 6a and the stirrup 8 fixed to the socket 7 secured to the cylinder of the jack 6, permits ensuring that, even after numerous locking and unlocking cycles, this second means will always be in the position of FIG. 2 whilst maintaining the respective plays $j_3$ and $j_4$.

The invention is particularly advantageous when it is applied to the balancing of vehicle wheels, but the application of the invention to any other sort of machine tool, machine drive, for starting in rotation a rotating body, does not depart from the scope of the present invention.

In its application to balancers, the invention permits the replacement of an existing spindle with a spindle according to the invention by virtue of the fact that the first prestressed elastic means 19 is secured to the rotatable drive shaft 10, between the two spaced bearings 3a and 3b secured to the plate 2: the external diameter of the rotatable drive shaft is accordingly of the same order as or equal to that of the rotatable drive shafts of balancing spindles of the prior art, which permits a quick standard exchange in the case in which the frames are provided with identical or compatible securement plates 1.

The invention described in reference to a particular embodiment is not thereby limited but covers on the contrary any modification of shape or variation of embodiment within the scope and spirit of the invention: the second means could be actuated manually instead of relying on an external power source; there would then be used a system with a lever, an eccentric, a connecting rod and crank or the like.

What is claimed is:

1. A rotatable drive spindle for quick mounting, comprising a hollow support shaft (10) mounted for rotation in two spaced bearings (3a, 3b) and carrying at a first end means (12) for starting and driving the shaft in rotation and at the second end a mounting flange (15) fixing a reference and holding plane for a body driven in rotation; a control rod (9) passing through said hollow support shaft (10) and displaceable between two positions of which a first position effects the extension of a locking means (17) of the body on said mounting flange (15) and a second unlocked position effects the release of said locking means (17) and the freeing of the body; first prestressed resilient means (19) to urge continuously the control rod (9) toward the first locking position and second means (6, 7, 8) that act against said first resilient means (19) and press the control rod (9) toward the second unlocked position; wherein the second means (6, 7, 8) is mounted to contact the hollow support shaft (10) and the control rod (9) in a manner such that by pulling on a configuration (11) secured to the hollow support shaft (10) to press on the control rod (9), no force is exerted on the bearings (3a, 3b).

2. Spindle according to claim 1, wherein the first prestressed resilient means (19) is a spring.

3. Spindle according to claim 1, wherein the second means (6, 7, 8) is mounted substantially coaxially of the control rod (9) with a floating mounting, so as not to be in contact with the control rod (9) during rotation of the spindle in the first locked position.

4. Spindle according to claim 1, wherein the second means (6, 7, 8) is so shaped as not to exert any force on rollers (18a, 18b) of the bearings (3a, 3b).

5. Spindle according to claim 1, wherein the control rod (9) carries at one end said extensible locking means and has at the other end a bearing surface (9a) spaced from said second means (6, 7, 8) in the first locking position, so as to prevent any influence of the second means (6, 7, 8) on the rotation of the spindle or any measurements taken during rotation of the spindle.

6. Spindle according to claim 1, wherein the second means (6, 7, 8) is prestressed in a position spaced with a predetermined play from the hollow shaft (10) in the course of rotation of the hollow shaft (10).

7. Spindle according to claim 1, wherein the control rod (9) carries an abutment (14) adapted to slide in a longitudinal opening (13) of the hollow shaft (10) between said first position and said second position and the first resilient means (19) is prestressed between said abutment (14) and a formation (20) secured to the hollow shaft (10).

8. Balancer comprising a spindle according to claim 1, which comprises a fixed plate (1) carrying said two spaced bearings (3a, 3b) on which is mounted rotatably an assembly comprising said hollow shaft (10), said control rod (9), said first prestressed resilient means (19) and said expansible locking means (17), and a support (4) on which is mounted said second means (6, 7, 8).

9. Balancer according to claim 8, wherein said second means (6, 7, 8) is mounted trapped on said support (4) with predetermined sliding play in the direction of displacement of the control rod (9).

10. Balancer according to claim 8, wherein the first prestressed resilient means (19) is secured in rotation with the rotatable drive shaft (10) and between the two spaced bearings (3a, 3b) secured to the plate (1).

11. A rotatable drive spindle for quick mounting, comprising:

a hollow support shaft (10) mounted for rotation in two spaced bearings (3a, 3b) and having at a first end means (12) for starting and driving the hollow support shaft in rotation and at a second end a mounting flange (15) fixing a reference and holding plane for a body to be driven in rotation;

a control rod (9) passing through the hollow support shaft (10) and displaceable between two positions, a first of the two positions effecting the extension of a locking means (17) of the body on said mounting flange (15), a second of the two positions being an unlocked position effecting a release of the locking means (17) and freeing the body;

first prestressed resilient means (19) to urge continuously the control rod (9) toward the first locking position; and second means (6, 7, 8) which act against the first resilient means (19) and press the control rod (9) toward the second unlocked position; wherein the second means (6, 7, 8) does not rotate, and the second means (6, 7, 8) is out of contact with the hollow support shaft (10) and the control rod (9) when the control rod (9) is in the first position; and the second means (6, 7, 8) is mounted relative to the hollow support shaft (10) and relative to the control rod (9) in a manner such that by pulling on a configuration (11) secured to the hollow support shaft (10) to press on the control rod (9), no force is exerted on the bearings (3a, 3b).

12. Spindle according to claim 11, wherein the first prestressed resilient means (19) is a spring.

13. Spindle according to claim 11, wherein the second means (6, 7, 8) is mounted substantially coaxially of the control rod (9) with a floating mounting.

14. Spindle according to claim 11, wherein the second means (6, 7, 8) is so shaped as not to exert any force on rollers (18a, 18b) of the bearings (3a, 3b).

15. Spindle according to claim 11, wherein the control rod (9) carries at one end said extensible locking means and has at the other end a bearing surface (9a) spaced from said second means (6, 7, 8) in the first locking position, so as to prevent any influence of the second means (6, 7, 8) on the rotation of the spindle or any measurements taken during rotation of the spindle.

16. Spindle according to claim 11, wherein the second means (6, 7, 8) is prestressed in a position spaced with a predetermined play from the hollow shaft (10) in the course of rotation of the hollow shaft (10).

17. Spindle according to claim 11, wherein the control rod (9) carries an abutment (14) adapted to slide in a longitudinal opening (13) of the hollow shaft (10) between said first position and said second position and the first resilient means (19) is prestressed between said abutment (14) and a formation (20) secured to the hollow shaft (10).

18. Balancer comprising a spindle according to claim 11, which comprises a fixed plate (1) carrying said two spaced bearings (3a, 3b) on which is mounted rotatably an assembly comprising said hollow shaft (10), said control rod (9), said first prestressed resilient means (19) and said expansible locking means (17), and a support (4) on which is mounted said second means (6, 7, 8).

19. Balancer according to claim 18, wherein said second means (6, 7, 8) is mounted trapped on said support (4) with predetermined sliding play in the direction of displacement of the control rod (9).

20. Balancer according to claim 18, wherein the first prestressed resilient means (19) is secured in rotation with the rotatable drive shaft (10) and between the two spaced bearings (3a, 3b) secured to the plate (1).

* * * * *